(12) United States Patent
Jeong et al.

(10) Patent No.: US 8,660,204 B2
(45) Date of Patent: Feb. 25, 2014

(54) DATA TRANSMITTER AND METHOD FOR FORMING SYMBOL THEREOF

(75) Inventors: Chan Bok Jeong, Daejeon (KR); Nam Il Kim, Daejeon (KR); Daeho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 349 days.

(21) Appl. No.: 13/224,639

(22) Filed: Sep. 2, 2011

(65) Prior Publication Data
US 2012/0093255 A1 Apr. 19, 2012

(30) Foreign Application Priority Data

Oct. 19, 2010 (KR) .................. 10-2010-0101866

(51) Int. Cl.
*H04L 27/00* (2006.01)
(52) U.S. Cl.
USPC .......................................... 375/290

(58) Field of Classification Search
USPC ......... 375/290, 259, 261, 271, 279, 300, 302, 375/309
See application file for complete search history.

(56) References Cited

U.S. PATENT DOCUMENTS

| | | | | |
|---|---|---|---|---|
| 5,659,695 A | * | 8/1997 | Kelley et al. | 711/5 |
| 7,099,426 B1 | * | 8/2006 | Cory et al. | 375/372 |
| 7,721,160 B2 | * | 5/2010 | Talbot | 714/52 |
| 2005/0172066 A1 | * | 8/2005 | Spencer et al. | 711/103 |

* cited by examiner

*Primary Examiner* — Kevin Kim
(74) *Attorney, Agent, or Firm* — Nelson Mullins Riley & Scarborough LLP; Anthony A. Laurentano, Esq.

(57) ABSTRACT

Provided is a data transmission device and a symbol generation method of the same. A data processing unit of a data transmission device according to an embodiment of the present invention accesses a memory device for reading another data block while symbols for one data block are generated.

20 Claims, 13 Drawing Sheets

DATA TRANSMITTER AND METHOD FOR FORMING SYMBOL THEREOF

CROSS-REFERENCE TO RELATED APPLICATIONS

This U.S. non-provisional patent application claims priority under 35 U.S.C. §119 of Korean Patent Application No. 10-2010-0101866, filed on Oct. 19, 2010, the entire contents of which are hereby incorporated by reference.

BACKGROUND OF THE INVENTION

The present invention disclosed herein relates to a data transmitter and an operation method of the same, and more particularly, to a data transmitter and a symbol formation method of the same.

A Long Term Evolution (LTE)-Advanced mobile communication system which is a leading candidate for a standard of 4th generation (4G) mobile communication technology has been developed to support various services based on a packet data transfer. In the LTE-Advanced mobile communication system, various transmission bandwidths from 1.4 MHz to 20 MHz are supported. The LTE-Advanced mobile communication system provides efficient data transfer, efficient frequency resource use, mobility, low latency, optimization for the packet data transfer, and guarantee of service quality. And, the LTE-Advanced mobile communication system provides a multimedia service of high speed and high quality and also provides a mobile image service.

According to a communication system prior to the LTE or LTE-Advanced mobile communication system, a single code-word is transferred to each user equipment. Therefore, according to the communication system prior to the LTE-Advanced mobile communication system, a data interface of sequential process method is used for each user equipment between en encoder and a modulator. However, according to the LTE or LTE-Advanced mobile communication system, a single code-word or multi code-word is transferred to each user equipment. Therefore, according to the LTE or LTE-Advanced mobile communication system, a data interface of parallel data process method should be used between an encoder and a modulator.

SUMMARY OF THE INVENTION

The present invention provides a data transmission device capable of generating symbols in parallel using hardware resources efficiently and a symbol generation method of the same.

Embodiments of the present invention provide symbol generation methods of a data transmission device which transfers data on a symbol basis, the symbol generation method including reading a first group of a first data block by accessing a memory device; generating symbols for the first group of the first data block; reading first and second groups of a second data block by accessing the memory device; and generating symbols respectively for the first and second groups of the second data block, wherein the memory device is accessed for reading the first and second groups of the second data block while the symbols for the first group of the first data block are generated.

In some embodiments, each group of the data blocks may have a data size of 36 bits.

In other embodiments, the generating the symbols may include determining the number of bits constituting the symbol according to a data transfer rate of the data transmission device.

In still other embodiments, a generation bit unit of the symbols for the second data block may be smaller than that of the symbols for the first data block.

In even other embodiments, a generation bit unit of the symbols for the second data block may be equal to that of the symbols for the first data block.

In yet other embodiments, a generation bit unit of the symbols for the second data block may be larger than that of the symbols for the first data block.

In further embodiments, the reading the first and second groups of the second data block may include reading the first group of the second block and reading the second group of the second data block, wherein the reading the second group of the second data block may be completed before completing the reading the first group of the second data block.

In still further embodiments, the symbol generation method may further include reading first to third groups of a third data block by accessing the memory device, and generating symbols for each of the first to third groups of the third data block.

In even further embodiments, a generation bit unit of the symbols for the third data block may be larger than that of the symbols for the second data block.

In yet further embodiments, the memory device may be accessed for reading the first and second groups of the third data block while the symbols for the first group of the second data block are generated.

In much further embodiments, the memory device may be accessed for reading the third group of the third data block while the symbols for the second group of the second data block are generated.

In still much further embodiments, a generation bit unit of the symbols for the third data block may be equal to or smaller that of the symbols for the second data block.

In even much further embodiments, the reading the first group of the second data block and the reading the second group of the second data block may be successively performed.

In yet much further embodiments, the memory device may be accessed for reading the second group of the second data block while the symbols for the first group of the second data block are generated.

In still further embodiments, each group of the data blocks may have a data size of 32 bits.

In still further embodiments, the symbol generation method may further include aligning the symbols generated for each of the data blocks.

In other embodiments of the present invention, data transmission devices include a memory device; a data storage unit configured to access the memory device and store a transfer data; and a data processing unit configured to access the memory device, read the transfer data, and generate a symbol for the read transfer data, wherein the data processing unit includes an address control unit configured to generate an address for accessing the memory device; and a symbol generation unit configured to generate a plurality of symbols sequentially or in parallel, wherein the address control unit accesses the memory device for reading a second data block while the symbol generation unit generates a symbol for a first data block.

In some embodiments, the symbol generation unit may include a plurality of buffer memory devices for storing a data block read from the memory device, wherein the symbol generation unit may store each of the first and second data block into one of the buffer memory devices and may generate symbols for each of the first and second data blocks in parallel.

In other embodiments, the data storage unit may be an encoder.

In still other embodiments, the data processing unit may be a modulator.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
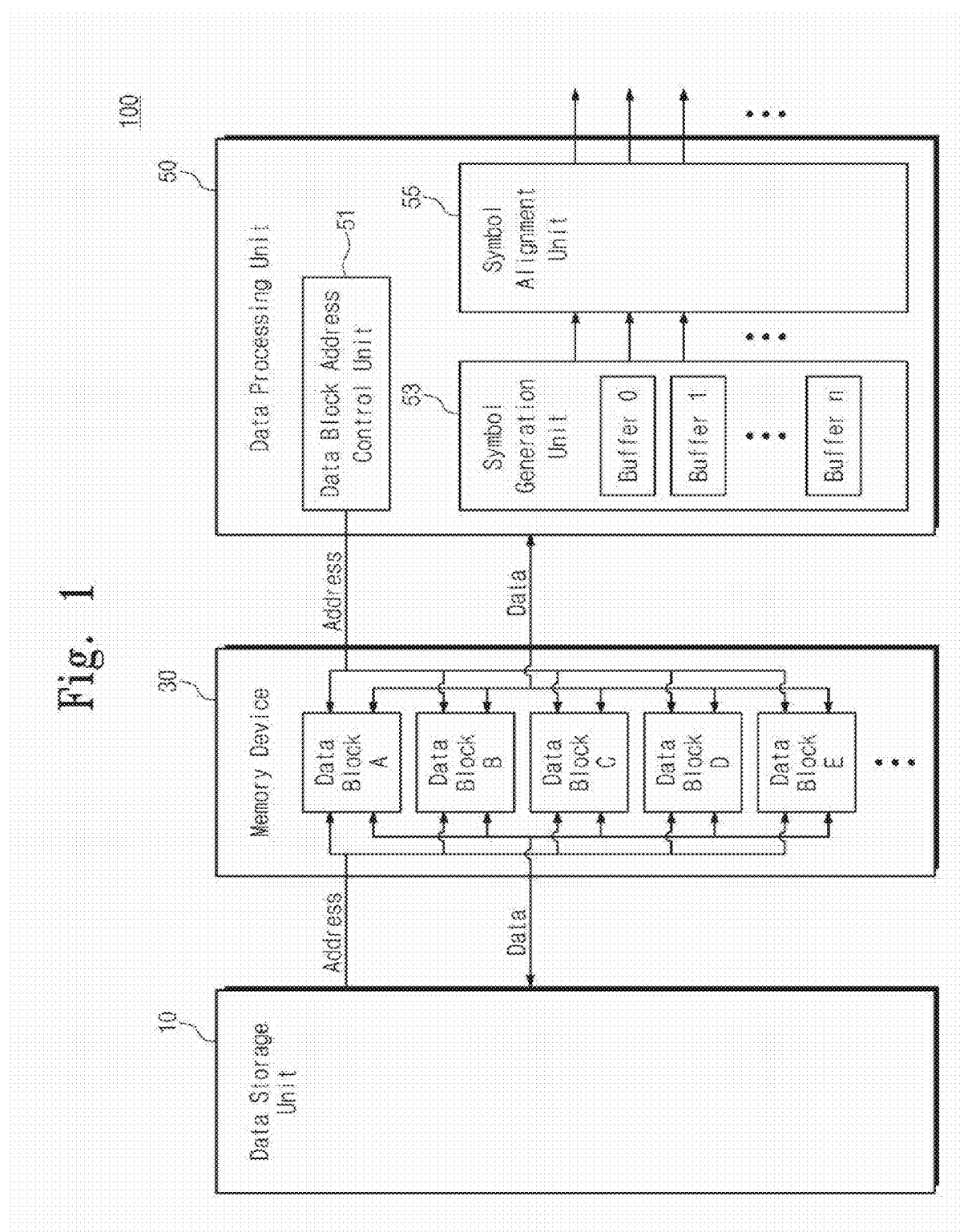
FIG. 1 is a block diagram illustrating a data transmission device according to an embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

In the drawings, dimensions are exaggerated for clarification and the embodiments of the present invention are not limited to illustrated particular forms. The particular terms used in the specification are not for limiting the limiting the present invention but for describing the present invention. Also, the meaning of "include," "comprise," "including," or "comprising," specifies a property, a region, a fixed number, a step, a process, an element and/or a component but does not exclude other properties, regions, fixed numbers, steps, processes, elements and/or components.

Hereinafter, it will be described about an exemplary embodiment of the present invention in conjunction with the accompanying drawings.

FIG. 1 is a block diagram illustrating a data transmission device according to an embodiment of the present invention. Referring to FIG. 1, a data transmission device 100 includes a data storage unit 10, a memory device 30, and a data processing unit 50. The data processing unit 50 includes a data block address control unit 51, a symbol generation unit 53, and a symbol alignment unit 55. Hereinafter, additional devices for transmitting data, e.g., an upper layer and an RF unit, will be omitted.

The data storage unit 10 stores a transfer data provided from an upper layer into the memory device 30. The data storage unit 10 processes the provided transfer data and generates a data block. The data storage unit 10 stores the generated data block into the memory device 30. The data storage unit 10 provides an address to the memory device 30 for storing the transfer data. Although not illustrated, the data storage unit 10 may provide a control signal to the memory device for storing the transfer data.

The memory device 30 stores the data block in response to control of the data storage unit 10. The memory device 30 outputs the stored data block in response to control of the data processing unit 50. That is, the memory device 30 may be a dual port memory device operated according to the control of the data storage unit 10 and the data processing unit 50. For instance, the memory device 30 may be a dual port RAM.

The data processing unit 50 reads the data block stored in the memory device 30. The data processing unit 50 provides an address to the memory device 30 for reading the data block stored in the memory device 30. This address is generated by the data block address control unit 51 and provided to the memory device 30. Although not illustrated, the data block address control unit 51 may provide a control signal to the memory device 30 for reading the data block. It is defined as a memory access to provide the address and the control signal to the memory device 30.

The data processing unit 50 generates a symbol which is a unit for transferring data. The number of bits constituting the symbol is changed according to a data transfer rate at which the data processing unit 50 transfers data. The data processing unit 50 includes the symbol generation unit 53 and the symbol alignment unit 55 for generating the symbol. The symbol generation unit 53 generates the symbol on a certain-bit basis for the data block read from the memory device 30. The symbol alignment unit 55 aligns the generated symbol and simultaneously outputs it.

The symbol generation unit 53 generates the symbol on a certain-bit basis. For instance, the symbol generation unit 53 may generate the symbol on a 2-bit, 4-bit, 6-bit, or 8-bit basis. As another example, the symbol generation unit 53 may generate the symbol on a basis of integer-multiplications of 2 bits, 4 bits, 6 bits, or 8 bits.

The symbol generation unit 53 includes a buffer memory device for temporarily storing the data block read from the memory device 30. The symbol generation unit 53 generates the symbol on a certain-bit basis for the data block temporarily stored in the buffer memory device. The symbol generation unit 53 may generate the symbol on the same-bit basis or different-bit basis for each data block stored in a plurality of buffer memory devices. For instance, the symbol generation unit 53 may generate the symbol on a 2-bit basis for the data block stored in a buffer-0 and may generate the symbol on a 4-bit basis for the data block stored in a buffer-1.

The symbol generation unit 53 includes a plurality of buffer memory devices, i.e., buffer-0 to buffer-n, for generating the symbol in parallel for a plurality of data blocks. The data blocks are temporarily stored in the buffer memory devices respectively. The symbol generation unit 53 generates the symbol in parallel for each data block stored in the buffer memory devices. Although it is exemplified that the symbol generation unit 53 generates the symbol in parallel in the embodiment of the present invention, it is understood of course that the symbol generation unit 53 may sequentially generate the symbol.

The data storage unit 10 and the data processing unit 50 of the data transmission device 100 according to the embodiment of the present invention may correspond to an encoder and a modulator. That is, the data storage unit 10 may perform a function of the encoder and the data processing unit 50 may perform a function of the modulator.

For instance, the data storage unit 10 may receive a transfer data from an upper layer and encode the received transfer data. The data storage unit 10 adds an error correction code to the transfer data to encode it. The encoded data being added with the error correction code is defined as the data block. The data storage unit 10 stores the data block such as BCH, DCI, or Down Link Share Channel (DL-SCH) into the memory device 30.

The data processing unit 50 modulates the data block stored in the memory device 30 in a determined modulation method. For instance, the data processing unit 50 performs the modulation operation in one method among Quadrature Phase Shift Keying (QPSK), 16 Quadrature Amplitude Modulation (16QAM), 64QAM, 256QAM, and 512QAM. The data processing unit 50 may determine the bit unit of the symbol according to a transfer rate of the modulation methods. The data processing unit 50 generates the symbol in parallel for generating the symbols as much as the number of subcarriers allotted to a user equipment. That is, the data processing unit 50 generates the symbols in parallel for each data block stored in the buffer memory devices.

Figure 2:
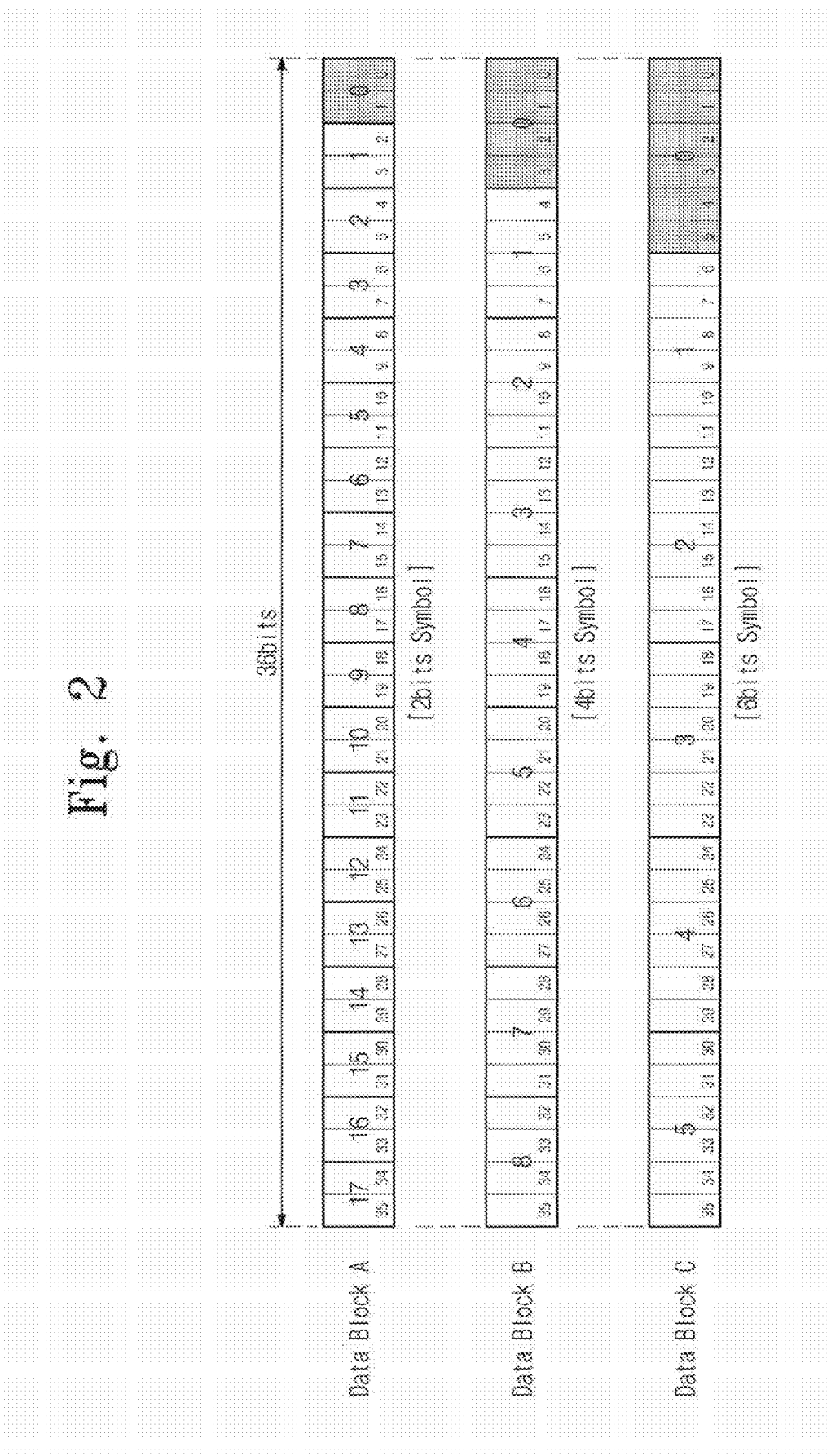
FIGS. 2 and 3 are concept diagrams for describing a first embodiment of the present invention.
Figure 3:
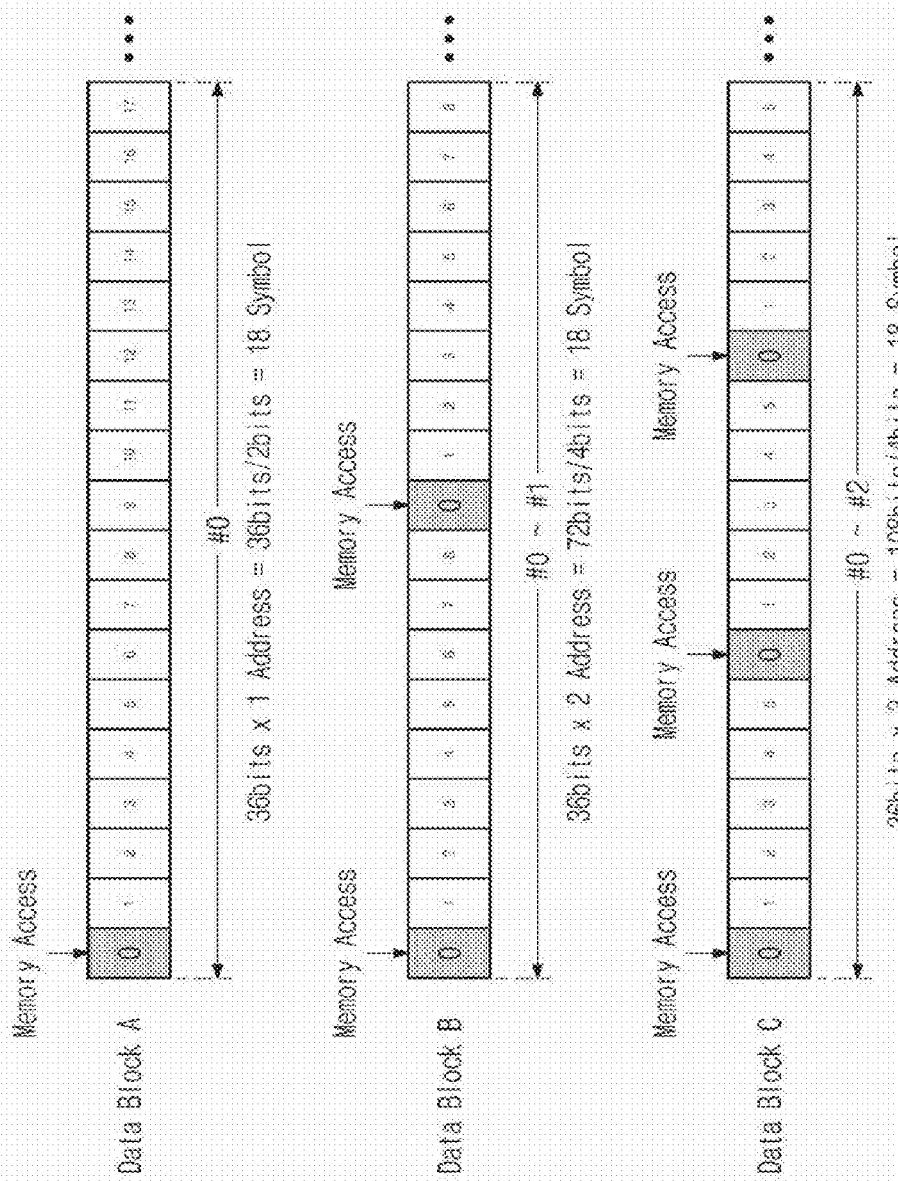

FIGS. 2 and 3 are concept diagrams for describing a first embodiment of the present invention. Referring to FIGS. 1 to 3, a method for generating the symbol of the data block according to the first embodiment of the present invention will be described.

According to the first embodiment of the present invention, the memory device 30 outputs a 36-bit data block for one address. That is, the memory device 30 outputs the 36-bit data block in response to one address provided by the data block address control unit 51. The symbol generation unit 53 generates the symbol on a certain-bit basis for the 36-bit data block provided by the memory device 30. It is illustrated in FIGS. 2 and 3 that the symbol generation unit 53 generates the symbol on a 2-bit, 4-bit, and 6-bit basis.

For instance, in the case that the symbol generation unit 53 generates the symbol on a 2-bit basis, the symbol generation unit 53 generates 18 symbols for a 36-bit data block A. As another example, in the case that the symbol generation unit 53 generates the symbol on a 4-bit basis, the symbol generation unit 53 generates 9 symbols for a 36-bit data block B. As another example, in the case that the symbol generation unit 53 generates the symbol on a 6-bit basis, the symbol generation unit 53 generates 6 symbols for a 36-bit data block C.

A period of access for the data block address control unit 51 to access the memory device 30 is illustrated in FIG. 3 in the case that the symbol generation unit 53 generates the symbols for each of the data blocks A to C. It is assumed that the symbol generation unit 53 generates 18 symbols. According to this assumption, in the case that the symbol generation unit 53 generates the symbols on a 2-bit basis, the data block address control unit 51 accesses the memory device 30 once. Also, in the case that the symbol generation unit 53 generates the symbols on a 4-bit basis, the data block address control unit 51 accesses the memory device 30 twice. Also, in the case that the symbol generation unit 53 generates the symbols on a 6-bit basis, the data block address control unit 51 accesses the memory device 30 three times.

In the case that the symbol generation unit 53 generates the symbols on the same-bit or different-bit basis, if the periods of accessing the memory device 30 do not collide with each other, the symbol generation unit 53 may generate the symbols in parallel. According to the symbol generation method according to the first embodiment of the present invention, the symbol generation unit 53 generates the symbols on a different-bit basis for each data block constituted with 36 bits. The symbol generation unit 53 includes the plurality of buffer memory devices for generating the symbols in parallel. The data blocks read from the memory device 30 are stored in the buffer memory devices respectively, and the symbol generation unit 53 generates the symbols for the stored data blocks. While the symbols are generated for one data block, the data block address control unit 51 accesses the memory device 30 for reading another data block.

Figure 4:
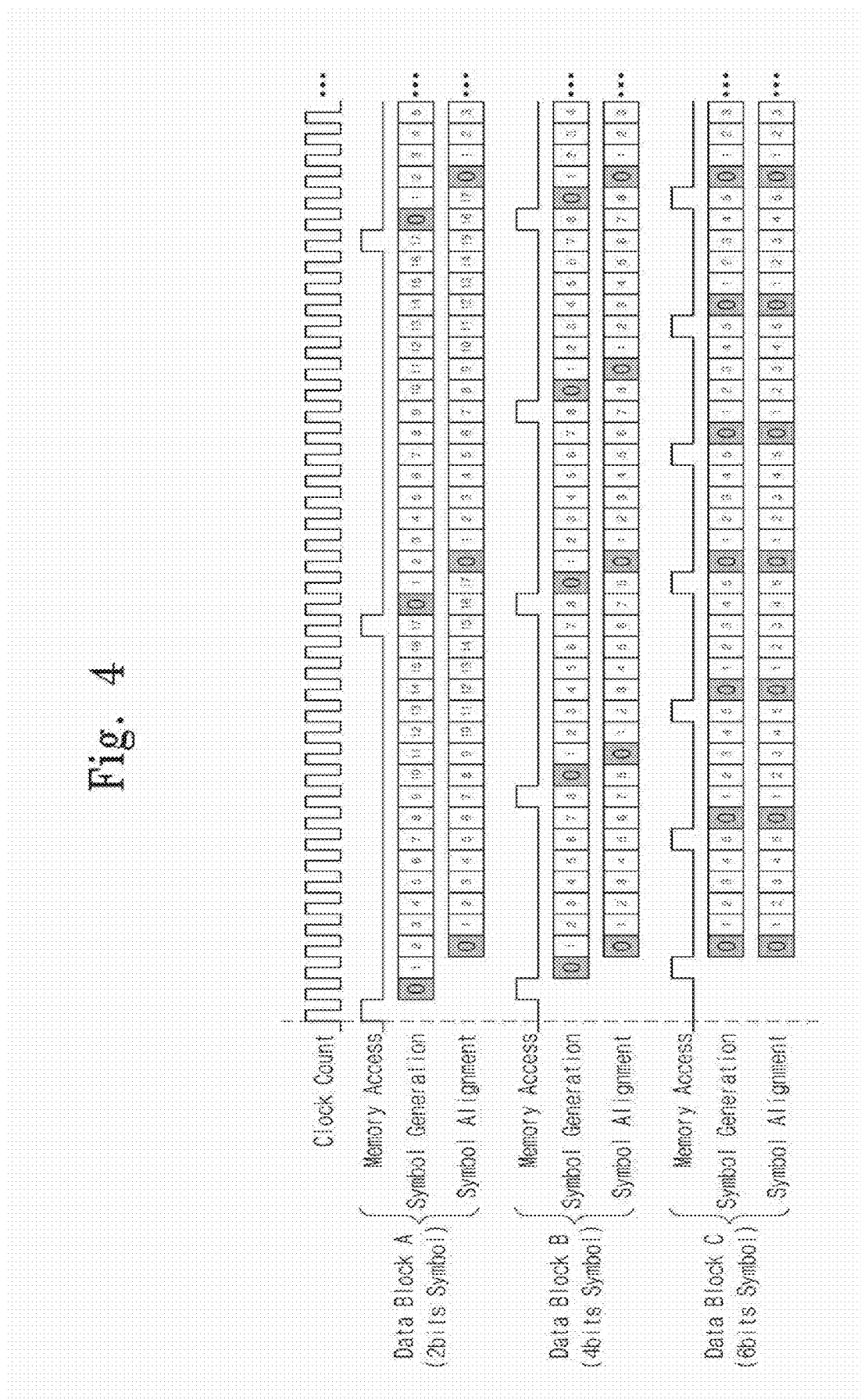
FIG. 4 is a timing diagram illustrating an operation of the first embodiment.

FIG. 4 is a timing diagram illustrating an operation of the first embodiment. Referring to FIG. 4, a clock count of the data processing unit 50 of FIG. 1, memory access periods for reading the data blocks A to C, symbol generation periods, and symbol alignment periods are illustrated.

In FIG. 4, the memory device 30 of FIG. 1 outputs data on a 36-bit basis in response to one address provided by the data block address control unit 51 of FIG. 1. Hereinafter, the data outputted on a 36-bit basis is defined as a data group of the data block. It is assumed that the data processing unit 50 generates the symbols on a 2-bit basis for the data block A, generates the symbols on a 4-bit basis for the data block B, and generates the symbols on a 6-bit basis for the data block C. Also, it is assumed that the data processing unit 50 generates 18 symbols for each data block.

The data block address control unit 51 accesses the memory device 30 in synchronization with a first clock to read the data block A. A first data group of the data block A provided by the memory device 30 is stored into a first buffer memory device of the symbol generation unit 53. The symbol generation unit 53 generates the symbols for the first data group of the data block A stored in the first buffer memory device in synchronization with a second clock. The symbol generation unit 53 generates the symbols on a 2-bit basis in synchronization with each clock starting from the second clock.

The data block address control unit 51 accesses the memory device 30 in synchronization with a second clock to read the data block B. A first data group of the data block B provided by the memory device 30 is stored into a second buffer memory device of the symbol generation unit 53. The symbol generation unit 53 generates the symbols for the first data group of the data block B stored in the second buffer memory device in synchronization with a third clock. The symbol generation unit 53 generates the symbols on a 4-bit basis in synchronization with each clock starting from the third clock.

Since the symbol generation unit 53 generates the symbols on a 4-bit basis for the data block B, a time point when the symbol generation for the first data group of the data block B is completed is earlier than that when the symbol generation for the first data group of the data block A is completed. That is, while the symbols for the first data group of the data block A are generated, the symbol generation for the first data group of the data block B is finished.

Accordingly, while the symbol generation unit 53 generates the symbols for the first data group of the data block A, the data block address control unit 51 accesses the memory device 30 in synchronization with an eleventh clock to read a second data group of the data block B. The second data group of the data block B provided by the memory device 30 is stored into a second buffer memory device of the symbol generation unit 53. The symbol generation unit 53 generates the symbols for the second data group of the data block B stored in the second buffer memory device in synchronization with each clock starting from a twelfth clock.

The data block address control unit 51 accesses the memory device 30 in synchronization with a third clock to read the data block C. A first data group of the data block C provided by the memory device 30 is stored into a third buffer memory device of the symbol generation unit 53. The symbol generation unit 53 generates the symbols for the first data group of the data block C stored in the third buffer memory device in synchronization with a fourth clock. The symbol generation unit 53 generates the symbols on a 6-bit basis in synchronization with each clock starting from the fourth clock.

Since the symbol generation unit 53 generates the symbols on a 6-bit basis for the data block C, a time point when the symbol generation for the first data group of the data block C is completed is earlier than that when the symbol generations for the first data groups of the data blocks A and B are completed. That is, while the symbols for the first data groups of the data blocks A and B are generated, the symbol generation for the first data group of the data block C is finished.

Accordingly, while the symbol generation unit 53 generates the symbols for the first data groups of the data blocks A and B, the data block address control unit 51 accesses the memory device 30 in synchronization with a ninth clock to read a second data group of the data block C. The second data group of the data block C provided by the memory device 30 is stored into a third buffer memory device of the symbol generation unit 53. The symbol generation unit 53 generates the symbols for the second data group of the data block C stored in the third buffer memory device in synchronization with each clock starting from a tenth clock.

Also, since the symbol generation unit 53 generates the symbols on a 6-bit basis for the data block C, a time point when the symbol generation for the second data group of the data block C is completed is earlier than that when the symbol generations for the first data group of the data block A and the second data group of the data block B are completed.

Accordingly, while the symbol generation unit 53 generates the symbols for the first data group of the data block A and the second data group of the data block B, the data block address control unit 51 accesses the memory device 30 in synchronization with a fifteenth clock to read a third data group of the data block C. The third data group of the data block C provided by the memory device 30 is stored into a third buffer memory device of the symbol generation unit 53. The symbol generation unit 53 generates the symbols for the third data group of the data block C stored in the third buffer memory device in synchronization with each clock starting from a sixteenth clock.

In FIG. 4, while the symbols for the first data group of the data block A are generated, the memory access is performed for reading the first and second data groups of the data block B. Also, while the symbols for the first data groups of the data blocks A and B are generated, the memory access is performed for reading the first and second data groups of the data block C. That is, while the symbols are generated for each data block on a different-bit basis, the data processing unit 50 may access the memory device 30 without conflicts to generate the symbols in parallel.

The symbol alignment unit 55 aligns the symbols generated for each of the data blocks A to C according to a generation order. That is, the symbol alignment unit 55 aligns the symbols having the same generation order and controls the aligned symbols to be provided to the outside of the data processing unit 50 at the same time.

Figure 5:
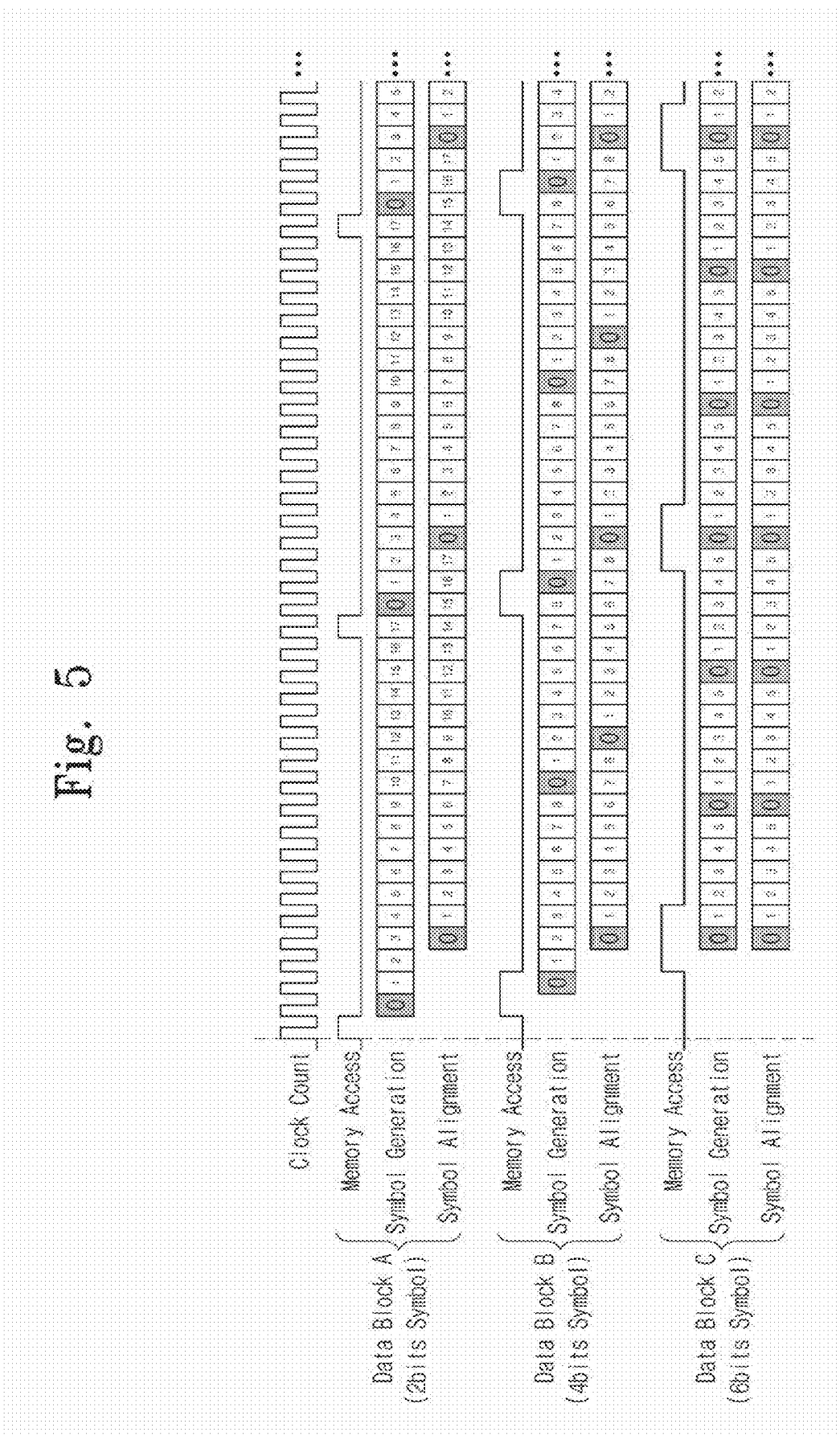
FIG. 5 is another timing diagram illustrating an operation of the first embodiment of the present invention.

FIG. 5 is another timing diagram illustrating an operation of the first embodiment of the present invention. Referring to FIG. 5, the clock count of the data processing unit 50 of FIG. 1, memory access periods for reading the data blocks A to C, symbol generation periods, and symbol alignment periods are illustrated.

In FIG. 5, the memory device 30 of FIG. 1 outputs data on a 36-bit basis in response to one address provided by the data block address control unit 51 of FIG. 1. Hereinafter, the data outputted on a 36-bit basis is defined as a data group of the data block. It is assumed that the data processing unit 50 generates the symbols on a 2-bit basis for the data block A, generates the symbols on a 4-bit basis for the data block B, and generates the symbols on a 6-bit basis for the data block C. Also, it is assumed that the data processing unit 50 generates 18 symbols for each data block.

The data block address control unit 51 accesses the memory device 30 in synchronization with a first clock to read the data block A. A first data group of the data block A provided by the memory device 30 is stored into a first buffer memory device of the symbol generation unit 53. The symbol generation unit 53 generates the symbols for the first data group of the data block A stored in the first buffer memory device in synchronization with a second clock. The symbol generation unit 53 generates the symbols on a 2-bit basis in synchronization with each clock starting from the second clock.

The data block address control unit 51 accesses the memory device 30 in synchronization with second and third clocks to read the data block B. First and second data groups of the data block B provided by the memory device 30 are stored into second and third buffer memory devices of the symbol generation unit 53. The symbol generation unit 53 generates the symbols for the first data group of the data block B stored in the second buffer memory device in synchronization with a third clock. The symbol generation unit 53 generates the symbols for the first and second data groups of the data block B stored in the second and third buffer memory devices on a 4-bit basis in synchronization with each clock starting from the third clock.

The data block address control unit 51 accesses the memory device 30 in synchronization with fourth to sixth clocks to read the data block C. First to third data groups of the data block C provided by the memory device 30 are stored into fourth to sixth buffer memory devices of the symbol generation unit 53. The symbol generation unit 53 generates the symbols for the first data group of the data block C stored in the fourth buffer memory device in synchronization with a fifth clock. The symbol generation unit 53 generates the symbols for the first to third data groups of the data block C stored in the fourth to sixth buffer memory devices on a 6-bit basis in synchronization with each clock starting from the fifth clock.

In FIG. 5, while the symbols for the first data group of the data block A are generated, the memory access operations are continuously performed for reading the first and second data groups of the data block B. Also, while the symbols for the first data groups of the data blocks A and B are generated, the memory access operations are continuously performed for reading the first to third data groups of the data block C. That is, while the symbols are generated for each data block on a different-bit basis, the data processing unit 50 may access the memory device 30 without conflicts to generate the symbols in parallel.

The symbol alignment unit 55 aligns the symbols generated for each of the data blocks A to C according to a generation order. That is, the symbol alignment unit 55 aligns the symbols having the same generation order and controls the aligned symbols to be provided to the outside of the data processing unit 50 at the same time.

Figure 6:
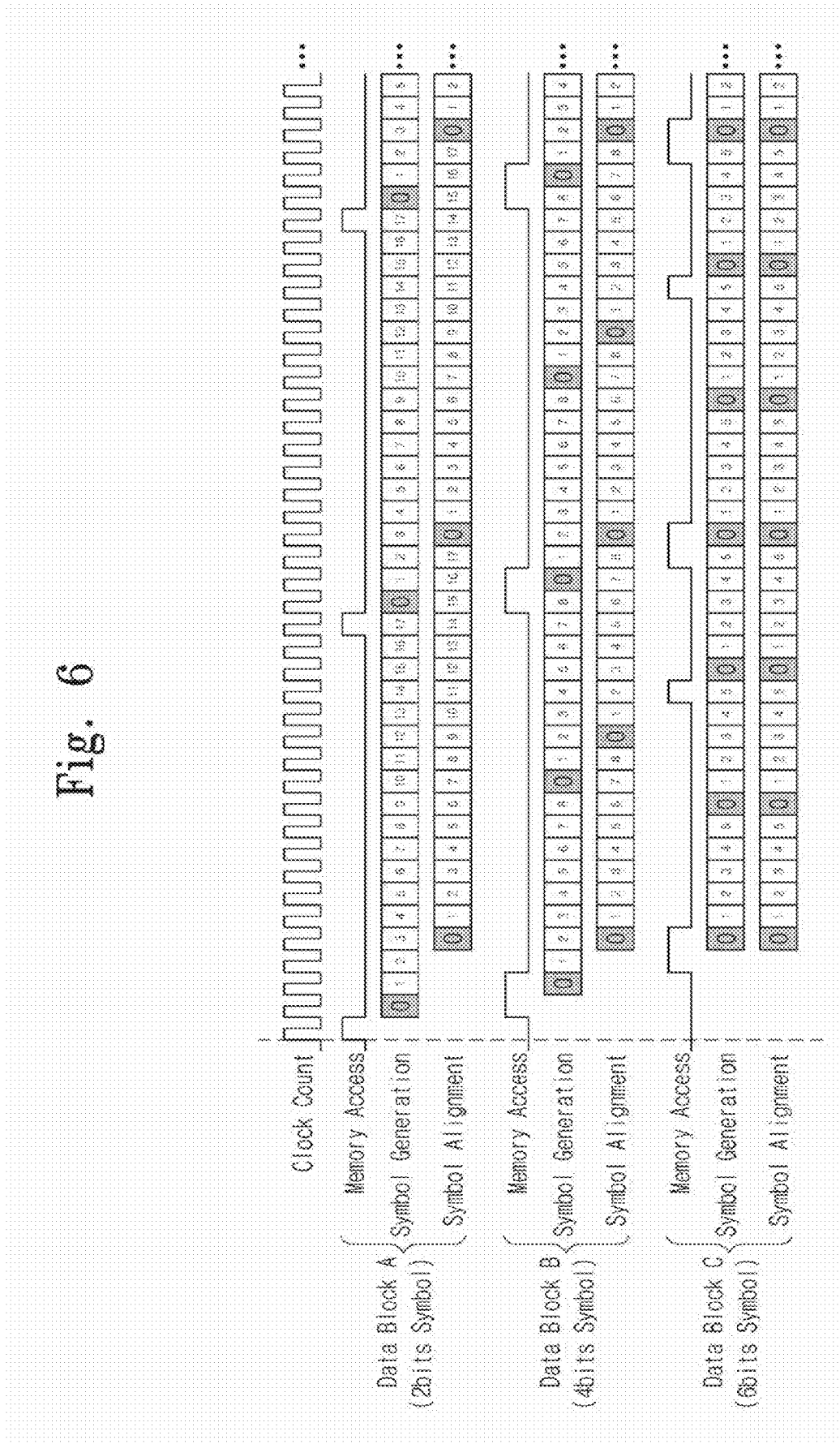
FIG. 6 is still another timing diagram illustrating an operation of the first embodiment of the present invention.

FIG. 6 is still another timing diagram illustrating an operation of the first embodiment of the present invention. In FIG. 6, the symbol generation operation for the data blocks except for the data block C is the same as that of FIG. 5. Therefore, for conciseness, only the symbol generation operation for the data block C will be described.

Referring to FIG. 6, while the symbols for the first data group of the data block A are generated, the memory access operations are continuously performed to read the first and second data groups of the data block B.

While the symbols for the first data groups of the data blocks A and B are generated, the memory access operations are performed to read the first and second data groups of the data block C. For instance, while the symbols for the first data groups of the data blocks A and B are generated, the memory access operations may be continuously performed to read the first and second data groups of the data block C. As another example, while the symbols for the first data groups of the data blocks A and B are generated, the memory access operations may be discontinuously performed to read the first and second data groups of the data block C. That is, although not illustrated in the drawing, the data block address control unit 51 may access the memory device 30 in synchronization with a clock prior to the tenth clock to read the second data group of the data block C.

And, while the symbols for the first data group of the data block A and the second data group of the data block B are generated, the memory access operation is performed to read the third data group of the data clock C. That is, while the symbols are generated for each data block on a different-bit basis, the data processing unit 50 may access the memory device 30 without conflicts to generate the symbols in parallel.

Figure 7:
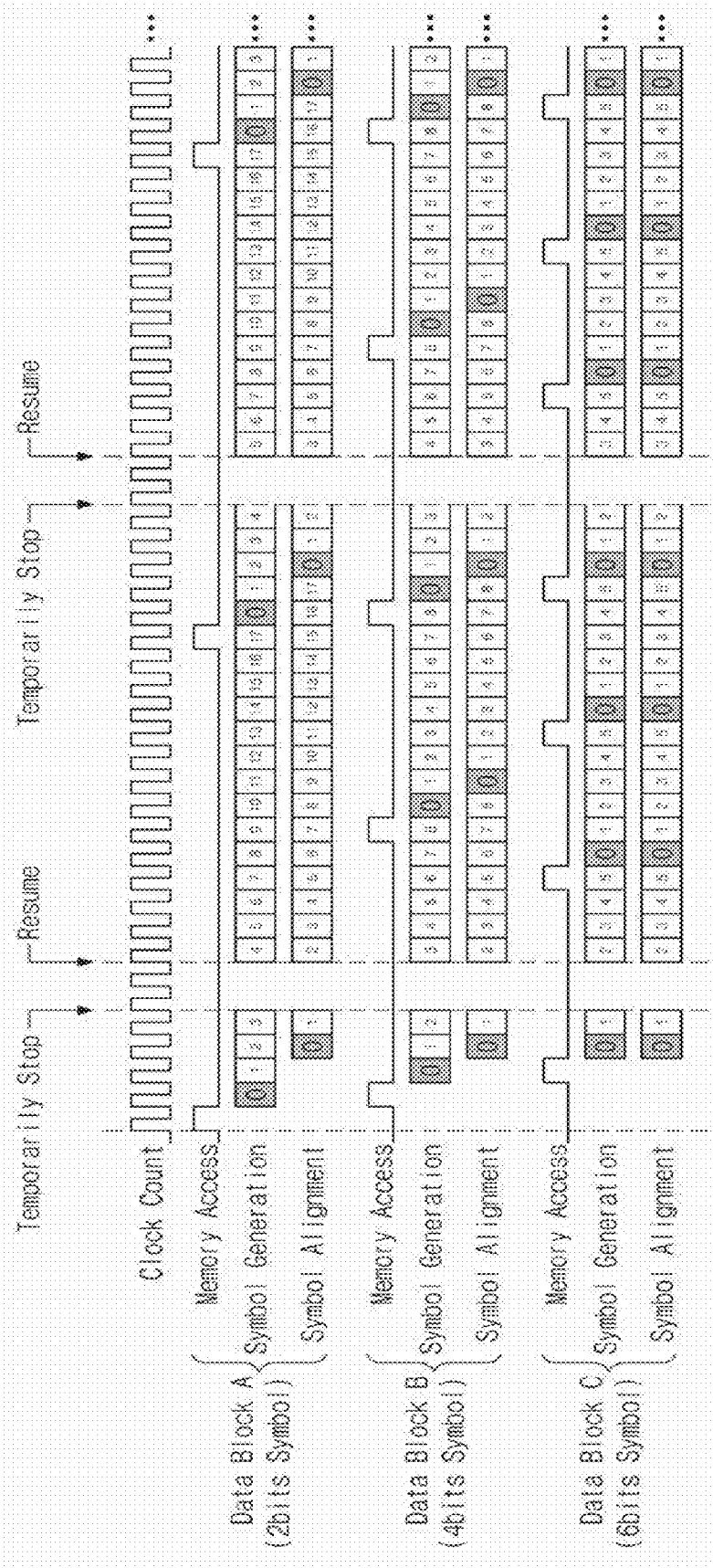
FIG. 7 is still another timing diagram illustrating an operation of the first embodiment of the present invention.

FIG. 7 is still another timing diagram illustrating an operation of the first embodiment of the present invention. In FIG. 7, the symbol generation operations of the data processing unit 50 for the data blocks A to C are the same as those of FIG. 4 except that the operation of the data processing unit 50 is temporarily stopped.

Referring to FIG. 7, the data processing unit 50 may temporarily stop the symbol generation operation for a certain time. In the case that the symbol generation operation of the data processing unit 50 is temporarily stopped, the state of the symbol generation for each of the data blocks A to C (e.g., data of the buffer memory devices and a degree of progress of the symbol generation) is maintained until the symbol generation operation is resumed. The data processing unit 50 resumes the symbol generation operation referring to the maintained symbol generation state.

Figure 8:
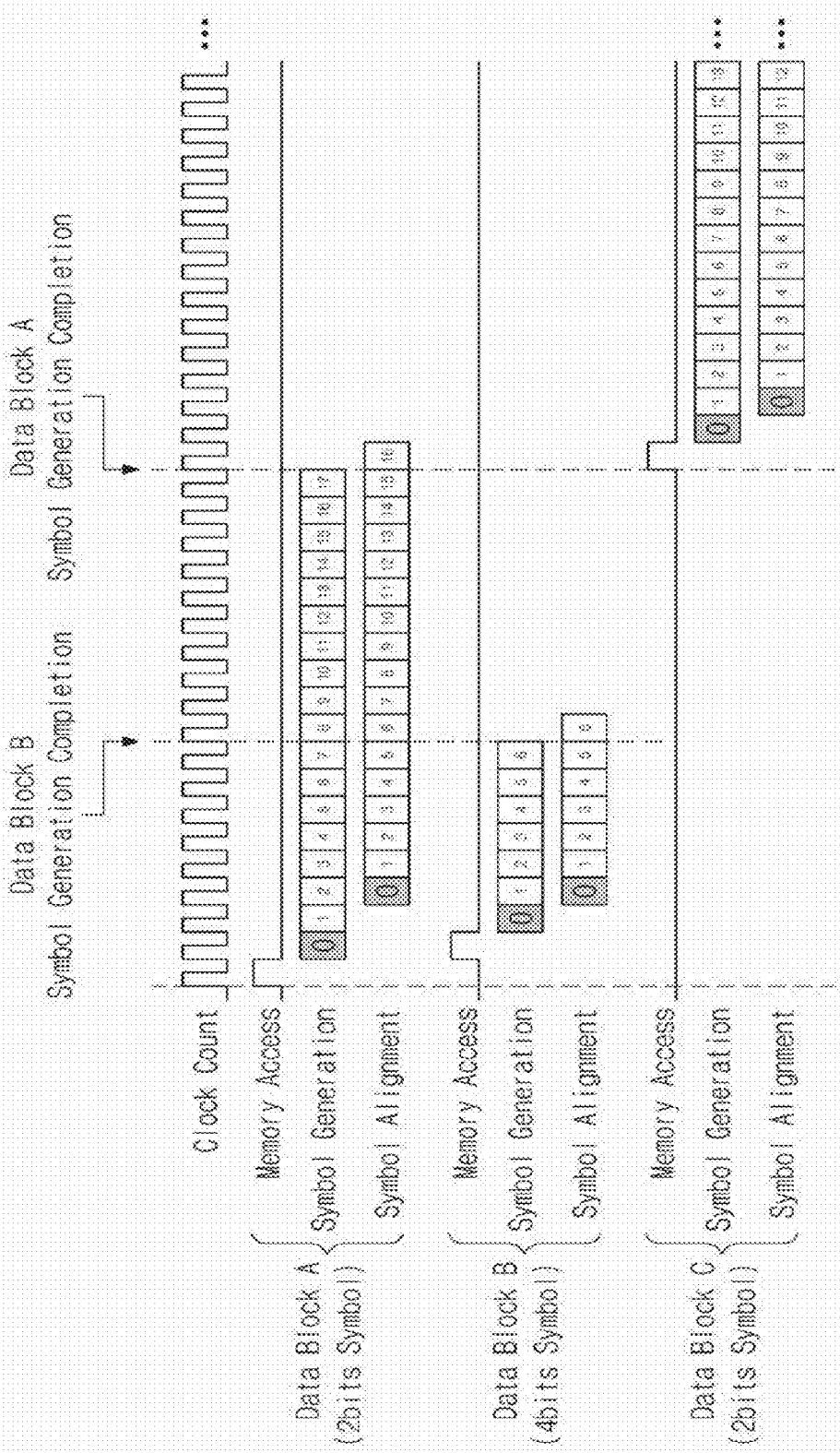
FIG. 8 is still another timing diagram illustrating an operation of the first embodiment of the present invention.

FIG. 8 is still another timing diagram illustrating an operation of the first embodiment of the present invention. Referring to FIG. 8, in the case that a size of the data block A is different from that of the data clock B, the symbol generation operation is described.

In the case of generating symbols for the data blocks having different sizes, the data processing unit 50 of FIG. 1 finishes the symbol generation operation for a smaller data block before finishing the symbol generation operation for a larger data block. For instance, as illustrated in FIG. 8, in the case that the data size of the data block A is 36 bits and the data size of the data block B is 28 bits, the data processing unit 50 may finish the symbol generation operation for the data block B before finishing the symbol generation operation for the data block A.

Also, if the symbol generation operation for the data block A is completed after the symbol generation operation for the data block B is completed, the data processing unit 50 performs the symbol generation operation for a new data block, i.e., the data block C. That is, if the operations for generating symbols in parallel are finished, the data processing unit 50 starts the symbol generation operation for a new data block.

Figure 9:
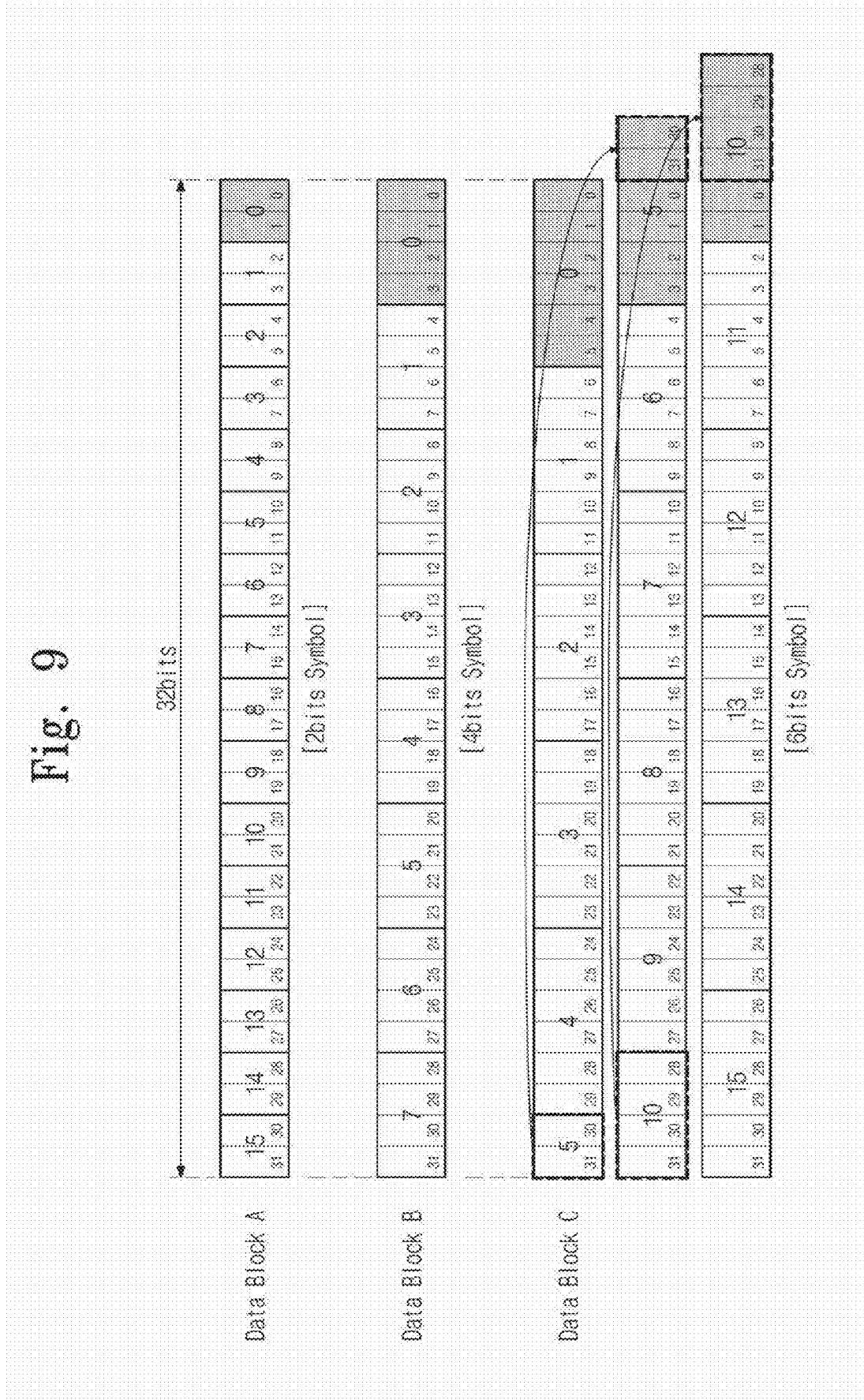
FIGS. 9 and 10 are concept diagrams for describing a second embodiment of the present invention.
Figure 10:
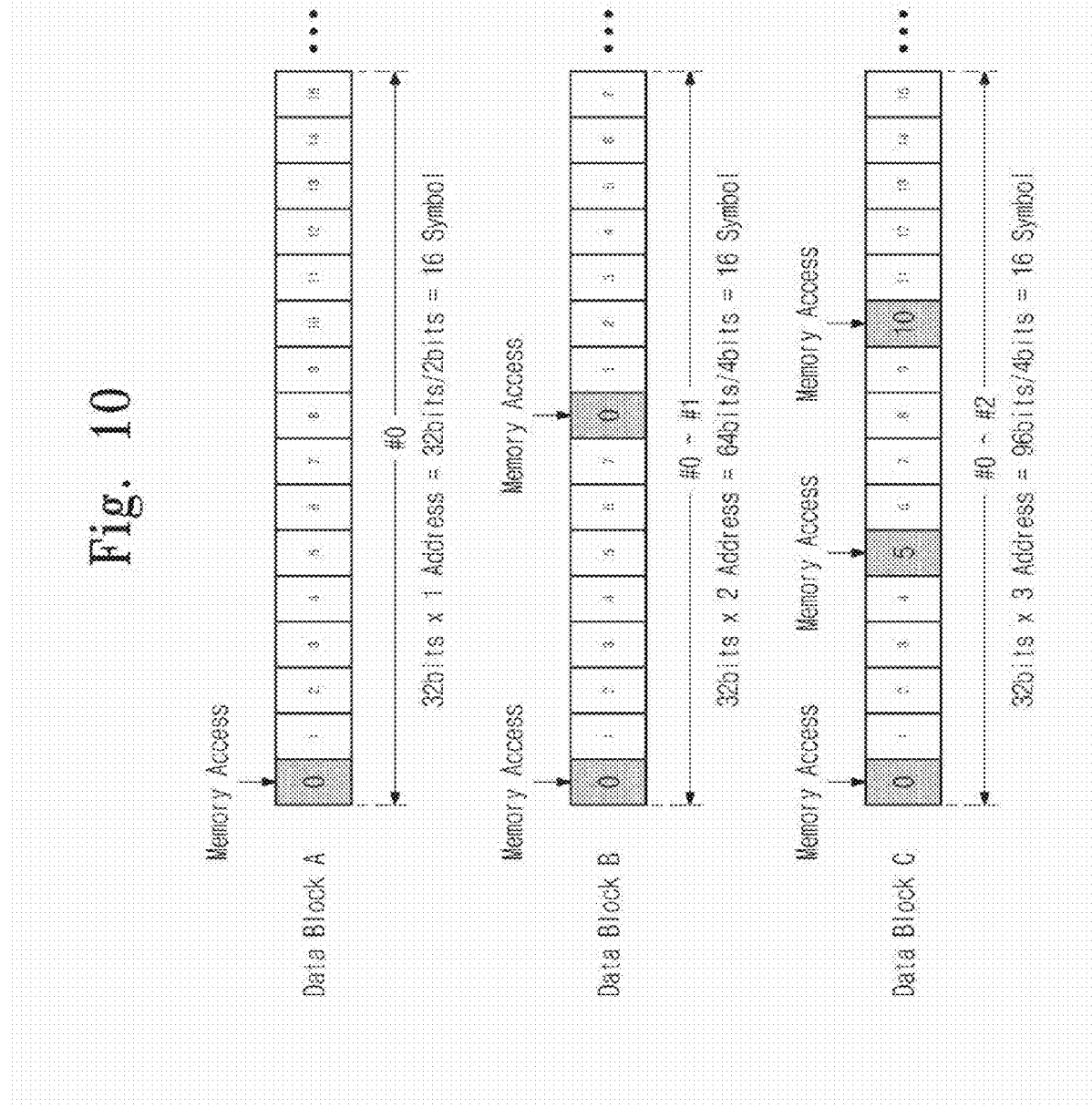

FIGS. 9 and 10 are concept diagrams for describing a second embodiment of the present invention. Referring to FIGS. 1, 9, and 10, a method for generating the symbol of the data block according to the second embodiment of the present invention will be described.

According to the second embodiment of the present invention, the memory device 30 outputs a 32-bit data block for one address. That is, the memory device 30 outputs the 32-bit data block in response to one address provided by the data block address control unit 51. The symbol generation unit 53 generates the symbol on a certain-bit basis for the 32-bit data block provided by the memory device 30. It is illustrated in FIGS. 9 and 10 that the symbol generation unit 53 generates the symbol on a 2-bit, 4-bit, and 6-bit basis.

For instance, in the case that the symbol generation unit 53 generates the symbol on a 2-bit basis, the symbol generation unit 53 generates 16 symbols for a 32-bit data block A. As another example, in the case that the symbol generation unit 53 generates the symbol on a 4-bit basis, the symbol generation unit 53 generates 8 symbols for a 32-bit data block B. As another example, in the case that the symbol generation unit 53 generates the symbol on a 6-bit basis, the symbol generation unit 53 generates 5 symbols for a 32-bit data block C and keeps the remaining bits. As illustrated in FIG. 9, the remaining bits are added to a later-provided 32-bit data to be generated as the symbol.

A period of access for the data block address control unit 51 to access the memory device 30 is illustrated in FIG. 10 in the case that the symbol generation unit 53 generates the symbols for each of the data blocks A to C. It is assumed that the symbol generation unit 53 generates 16 symbols. According to this assumption, in the case that the symbol generation unit 53 generates the symbols on a 2-bit basis, the data block address control unit 51 accesses the memory device 30 once. Also, in the case that the symbol generation unit 53 generates the symbols on a 4-bit basis, the data block address control unit 51 accesses the memory device 30 twice. Also, in the case that the symbol generation unit 53 generates the symbols on a 6-bit basis, the data block address control unit 51 accesses the memory device 30 three times.

In the case that the symbol generation unit 53 generates the symbols on the same-bit or different-bit basis, if the periods of accessing the memory device 30 do not collide with each other, the symbol generation unit 53 may generate the symbols in parallel. According to the symbol generation method according to the second embodiment of the present invention, the symbol generation unit 53 generates the symbols on a different-bit basis for each data block constituted with 32 bits. The symbol generation unit 53 includes the plurality of buffer memory devices for generating the symbols in parallel. The data blocks read from the memory device 30 are stored in the buffer memory devices respectively, and the symbol generation unit 53 generates the symbols for the stored data blocks. While the symbols are generated for one data block, the data block address control unit 51 accesses the memory device 30 for reading another data block.

Figure 11:
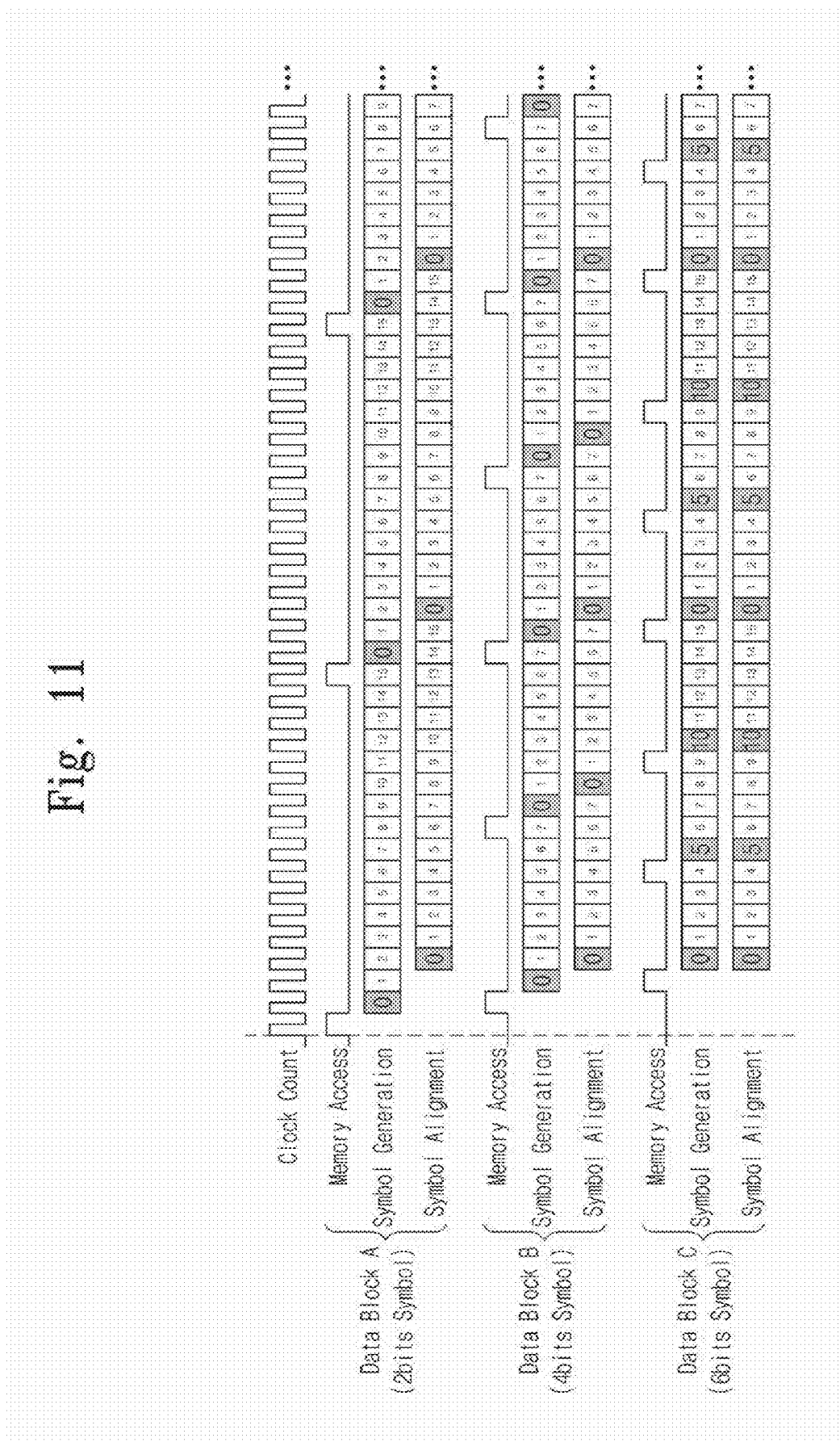
FIG. 11 is a timing diagram illustrating an operation of the second embodiment.

FIG. 11 is a timing diagram illustrating an operation of the second embodiment. Referring to FIG. 11, a clock count of the data processing unit 50 of FIG. 1, memory access periods for reading the data blocks A to C, symbol generation periods, and symbol alignment periods are illustrated.

In FIG. 11, the memory device 30 of FIG. 1 outputs data on a 32-bit basis in response to one address provided by the data block address control unit 51 of FIG. 1. Hereinafter, the data outputted on a 32-bit basis is defined as a data group of the data block. It is assumed that the data processing unit 50 generates the symbols on a 2-bit basis for the data block A, generates the symbols on a 4-bit basis for the data block B, and generates the symbols on a 6-bit basis for the data block C. Also, it is assumed that the data processing unit 50 generates 16 symbols for each data block.

The data block address control unit 51 accesses the memory device 30 in synchronization with a first clock to read the data block A. A first data group of the data block A provided by the memory device 30 is stored into a first buffer memory device of the symbol generation unit 53. The symbol generation unit 53 generates the symbols for the first data group of the data block A stored in the first buffer memory device in synchronization with a second clock. The symbol generation unit 53 generates the symbols on a 2-bit basis in synchronization with each clock starting from the second clock.

The data block address control unit 51 accesses the memory device 30 in synchronization with a second clock to read the data block B. A first data group of the data block B provided by the memory device 30 is stored into a second buffer memory device of the symbol generation unit 53. The symbol generation unit 53 generates the symbols for the first data group of the data block B stored in the second buffer memory device in synchronization with a third clock. The symbol generation unit 53 generates the symbols on a 4-bit basis in synchronization with each clock starting from the third clock.

Since the symbol generation unit 53 generates the symbols on a 4-bit basis for the data block B, a time point when the symbol generation for the first data group of the data block B is completed is earlier than that when the symbol generation for the first data group of the data block A is completed. That is, while the symbols for the first data group of the data block A are generated, the symbol generation for the first data group of the data block B is finished.

Accordingly, while the symbol generation unit 53 generates the symbols for the first data group of the data block A, the data block address control unit 51 accesses the memory device 30 in synchronization with a tenth clock to read a second data group of the data block B. The second data group of the data block B provided by the memory device 30 is stored into a second buffer memory device of the symbol generation unit 53. The symbol generation unit 53 generates the symbols for the second data group of the data block B stored in the second buffer memory device in synchronization with each clock starting from an eleventh clock.

The data block address control unit 51 accesses the memory device 30 in synchronization with a third clock to read the data block C. A first data group of the data block C provided by the memory device 30 is stored into a third buffer memory device of the symbol generation unit 53. The symbol generation unit 53 generates the symbols for the first data group of the data block C stored in the third buffer memory device in synchronization with a fourth clock. The symbol generation unit 53 generates the symbols on a 6-bit basis in synchronization with each clock starting from the fourth clock.

The first data group of the data block C is constituted with 32 bits, and the symbol generation unit 53 generates the symbols on a 6-bit basis for the data block C. Accordingly, the first data group of the data block C is generated as 5 symbols and 2 bits of data remain. Therefore, while the symbol generation unit 53 generates the symbols for the first data groups of the data blocks A and B, the data block address control unit 51 accesses the memory device 30 in synchronization with an eighth clock to read a second data group of the data block C. The second data group of the data block C provided by the memory device 30 is stored into a fourth buffer memory device of the symbol generation unit 53. The symbol generation unit 53 generates the symbols for the first and second data groups of the data block C stored in the third and fourth buffer memory devices in synchronization with each clock starting from a ninth clock.

In the same manner described above, the second data group of the data block C is constituted with 32 bits and the symbol generation unit 53 generates the symbols for the data block C on a 6-bit basis. Accordingly, the remaining 2-bit data of the first group of the data block C and the second group of the data block C are generated as 5 symbols, and 4-bit data remain. Therefore, while the symbol generation unit 53 generates the symbols for the first data group of the data block A and the second data group of the data block B, the data block address control unit 51 accesses the memory device 30 in synchronization with a thirteenth clock to read a third data group of the data block C. The third data group of the data block C provided by the memory device 30 is stored into the third buffer memory device of the symbol generation unit 53. The symbol generation unit 53 generates the symbols for the second and third data groups of the data block C stored in the third and fourth buffer memory devices in synchronization with each clock starting from a fourteenth clock.

In FIG. 11, while the symbols for the first data group of the data block A are generated, the memory access is performed for reading the first and second data groups of the data block B. Also, while the symbols for the first data groups of the data blocks A and B are generated, the memory access is performed for reading the first and second data groups of the data block C. That is, while the symbols are generated for each data block on a different-bit basis, the data processing unit 50 may access the memory device 30 without conflicts to generate the symbols in parallel.

The symbol alignment unit 55 aligns the symbols generated for each of the data blocks A to C according to a generation order. That is, the symbol alignment unit 55 aligns the symbols having the same generation order and controls the aligned symbols to be provided to the outside of the data processing unit 50 at the same time.

Figure 12:
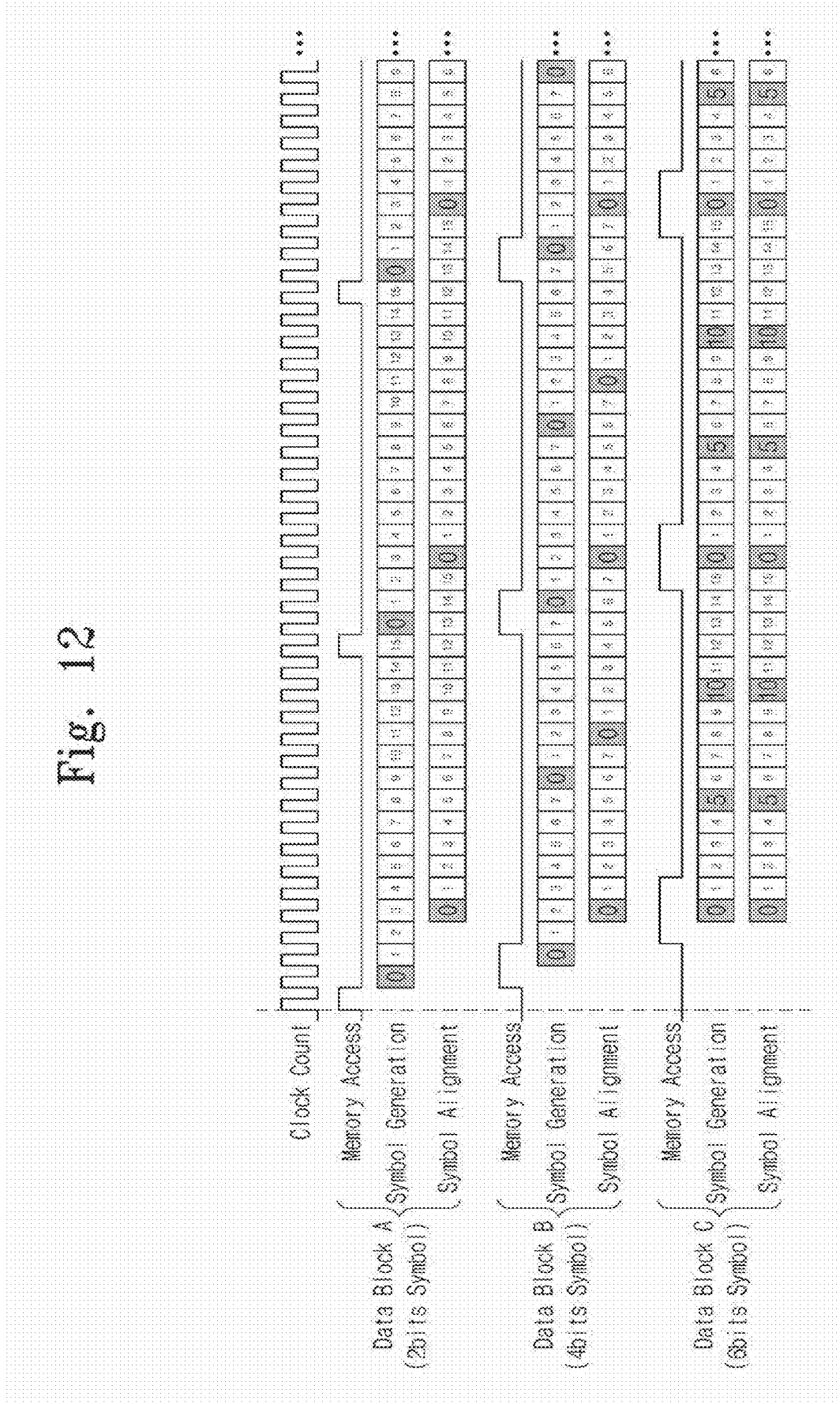
FIG. 12 is another timing diagram illustrating an operation of the second embodiment of the present invention.

FIG. 12 is another timing diagram illustrating an operation of the second embodiment of the present invention. Referring to FIG. 12, the clock count of the data processing unit 50 of FIG. 1, memory access periods for reading the data blocks A to C, symbol generation periods, and symbol alignment periods are illustrated.

In FIG. 12, the memory device 30 of FIG. 1 outputs data on a 32-bit basis in response to one address provided by the data block address control unit 51 of FIG. 1. Hereinafter, the data outputted on a 32-bit basis is defined as a data group of the data block. It is assumed that the data processing unit 50 generates the symbols on a 2-bit basis for the data block A, generates the symbols on a 4-bit basis for the data block B, and generates the symbols on a 6-bit basis for the data block C. Also, it is assumed that the data processing unit 50 generates 16 symbols for each data block.

The data block address control unit 51 accesses the memory device 30 in synchronization with a first clock to read the data block A. A first data group of the data block A provided by the memory device 30 is stored into a first buffer memory device of the symbol generation unit 53. The symbol generation unit 53 generates the symbols for the first data group of the data block A stored in the first buffer memory device in synchronization with a second clock. The symbol generation unit 53 generates the symbols on a 2-bit basis in synchronization with each clock starting from the second clock.

The data block address control unit 51 accesses the memory device 30 in synchronization with second and third clocks to read the data block B. The first and second data groups of the data block B provided by the memory device 30 are respectively stored into the second and third buffer memory devices of the symbol generation unit 53. The symbol generation unit 53 generates the symbols for the first data group of the data block B stored in the second buffer memory device in synchronization with a third clock. The symbol generation unit 53 generates the symbols for the first and second data groups of the data block B stored in the second and third buffer memory devices on a 4-bit basis in synchronization with each clock starting from the third clock.

The data block address control unit 51 accesses the memory device 30 in synchronization with fourth to sixth clocks to read the data block C. First to third data groups of the data block C provided by the memory device 30 are respectively stored into fourth to sixth buffer memory devices of the symbol generation unit 53. The symbol generation unit 53 generates the symbols for the first data group of the data block C stored in the fourth buffer memory device in synchronization with a fifth clock. The symbol generation unit 53 generates the symbols for the first to third data groups of the data block C stored in the fourth to sixth buffer memory devices on a 6-bit basis in synchronization with each clock starting from the fifth clock.

In FIG. 12, while the symbols for the first data group of the data block A are generated, the memory access operations are continuously performed for reading the first and second data groups of the data block B. Also, while the symbols for the first data groups of the data blocks A and B are generated, the memory access operations are continuously performed for reading the first to third data groups of the data block C. That is, while the symbols are generated for each data block on a different-bit basis, the data processing unit 50 may access the memory device 30 without conflicts to generate the symbols in parallel.

The symbol alignment unit 55 aligns the symbols generated for each of the data blocks A to C according to a generation order. That is, the symbol alignment unit 55 aligns the symbols having the same generation order and controls the aligned symbols to be provided to the outside of the data processing unit 50 at the same time.

Figure 13:
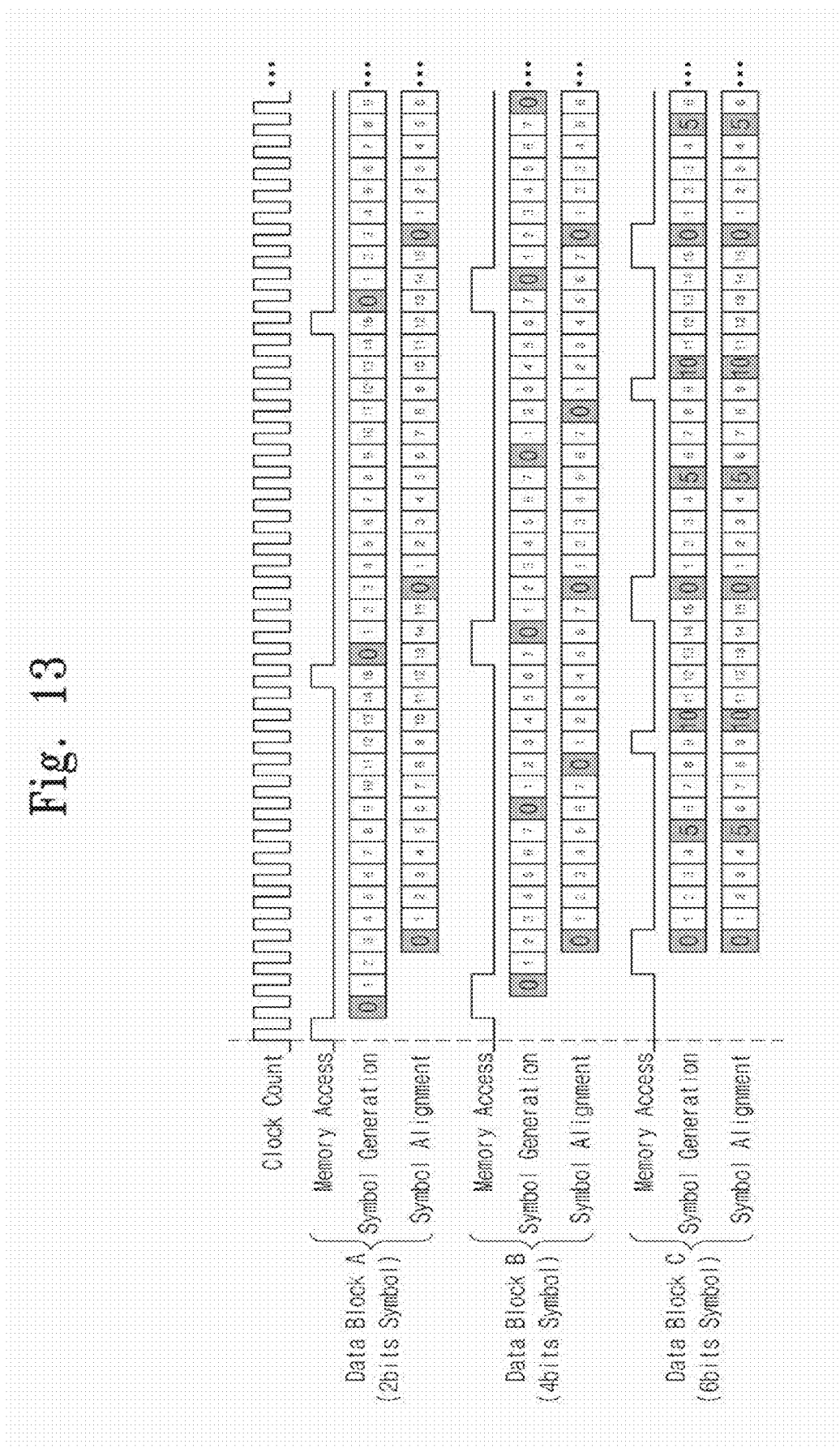
FIG. 13 is still another timing diagram illustrating an operation of the second embodiment of the present invention.

FIG. 13 is still another timing diagram illustrating an operation of the second embodiment of the present invention. In FIG. 13, the symbol generation operation for the data blocks except for the data block C is the same as that of FIG. 12. Therefore, for conciseness, only the symbol generation operation for the data block C will be described.

Referring to FIG. 13, while the symbols for the first data group of the data block A are generated, the memory access operations are continuously performed to read the first and second data groups of the data block B.

While the symbols for the first data groups of the data blocks A and B are generated, the memory access operations are performed to read the first and second data groups of the data block C. For instance, while the symbols for the first data groups of the data blocks A and B are generated, the memory access operations may be continuously performed to read the first and second data groups of the data block C. As another example, while the symbols for the first data groups of the data blocks A and B are generated, the memory access operations may be discontinuously performed to read the first and second data groups of the data block C. That is, although not illustrated in the drawing, the data block address control unit 51 may access the memory device 30 in synchronization with a clock prior to the ninth clock to read the second data group of the data block C.

And, while the symbols for the first data group of the data block A and the second data group of the data block B are generated, the memory access operation is performed to read the third data group of the data clock C. That is, while the symbols are generated for each data block on a different-bit basis, the data processing unit 50 may access the memory device 30 without conflicts to generate the symbols in parallel.

According to the embodiments of the present invention, interface conflicts between hardware resources of the transmission device can be prevented and symbols can be generated in parallel.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A symbol generation method of a data transmission device which transfers data on a symbol basis, the symbol generation method comprising:
   reading a first group of a first data block by accessing a memory device;
   generating symbols for the first group of the first data block;
   reading first and second groups of a second data block by accessing the memory device; and
   generating symbols respectively for the first and second groups of the second data block,
   wherein the memory device is accessed for reading the first and second groups of the second data block while the symbols for the first group of the first data block are generated.

2. The symbol generation method of claim 1, wherein each group of the data blocks has a data size of 36 bits.

3. The symbol generation method of claim 2, wherein the generating the symbols comprises determining the number of bits constituting the symbol according to a data transfer rate of the data transmission device.

4. The symbol generation method of claim 3, wherein a generation bit unit of the symbols for the second data block is smaller than that of the symbols for the first data block.

5. The symbol generation method of claim 3, wherein a generation bit unit of the symbols for the second data block is equal to that of the symbols for the first data block.

6. The symbol generation method of claim 3, wherein a generation bit unit of the symbols for the second data block is larger than that of the symbols for the first data block.

7. The symbol generation method of claim 6, wherein the reading the first and second groups of the second data block comprises reading the first group of the second block and reading the second group of the second data block, wherein the reading the second group of the second data block is completed before completing the reading the first group of the second data block.

8. The symbol generation method of claim 7, further comprising:
    reading first to third groups of a third data block by accessing the memory device, and
    generating symbols for each of the first to third groups of the third data block.

9. The symbol generation method of claim 8, wherein a generation bit unit of the symbols for the third data block is larger than that of the symbols for the second data block.

10. The symbol generation method of claim 9, wherein the memory device is accessed for reading the first and second groups of the third data block while the symbols for the first group of the second data block are generated.

11. The symbol generation method of claim 9, wherein the memory device is accessed for reading the third group of the third data block while the symbols for the second group of the second data block are generated.

12. The symbol generation method of claim 8, wherein a generation bit unit of the symbols for the third data block is equal to or smaller that of the symbols for the second data block.

13. The symbol generation method of claim 7, wherein the reading the first group of the second data block and the reading the second group of the second data block are successively performed.

14. The symbol generation method of claim 13, wherein the memory device is accessed for reading the second group of the second data block while the symbols for the first group of the second data block are generated.

15. The symbol generation method of claim 1, wherein each group of the data blocks has a data size of 32 bits.

16. The symbol generation method of claim 1, further comprising aligning the symbols generated for each of the data blocks.

17. A data transmission device, comprising:
    a memory device;
    a data storage unit configured to access the memory device and store a transfer data; and
    a data processing unit configured to access the memory device, read the transfer data, and generate a symbol for the read transfer data,
    wherein the data processing unit comprises an address control unit configured to generate an address for accessing the memory device; and a symbol generation unit configured to generate a plurality of symbols sequentially or in parallel,
    wherein the address control unit accesses the memory device for reading a second data block while the symbol generation unit generates a symbol for a first data block.

18. The data transmission device of claim 17, wherein the symbol generation unit comprises a plurality of buffer memory devices for storing a data block read from the memory device, wherein the symbol generation unit stores each of the first and second data block into one of the buffer memory devices and generates symbols for each of the first and second data blocks in parallel.

19. The data transmission device of claim 17, wherein the data storage unit is an encoder.

20. The data transmission device of claim 17, wherein the data processing unit is a modulator.

* * * * *